(12) United States Patent
Yager

(10) Patent No.: US 8,141,359 B2
(45) Date of Patent: Mar. 27, 2012

(54) SYSTEM AND METHOD FOR LOCOMOTIVE EXHAUST GAS RECIRCULATION COOLING AND CATALYST HEATING

(75) Inventor: James Henry Yager, North East, PA (US)

(73) Assignee: General Electric Company, Schenectady, NY (US)

( * ) Notice: Subject to any disclaimer, the term of this patent is extended or adjusted under 35 U.S.C. 154(b) by 849 days.

(21) Appl. No.: 12/203,670

(22) Filed: Sep. 3, 2008

(65) Prior Publication Data
US 2010/0050631 A1    Mar. 4, 2010

(51) Int. Cl.
F02B 33/44    (2006.01)
(52) U.S. Cl. .............. 60/605.2; 60/278; 60/280
(58) Field of Classification Search .......... 60/278, 60/280, 605.2
See application file for complete search history.

(56) References Cited

U.S. PATENT DOCUMENTS

| | | | | |
|---|---|---|---|---|
| 5,983,628 A * | 11/1999 | Borroni-Bird et al. | ......... | 60/274 |
| 6,868,329 B2 * | 3/2005 | Ito et al. | ......... | 701/108 |
| 7,165,399 B2 * | 1/2007 | Stewart | ......... | 60/600 |
| 7,669,417 B2 * | 3/2010 | Smith | ......... | 60/599 |
| 7,921,647 B2 * | 4/2011 | Grunditz et al. | ......... | 60/605.2 |
| 2005/0188682 A1 * | 9/2005 | Fledersbacher et al. | ......... | 60/284 |
| 2006/0213184 A1 * | 9/2006 | Stewart | ......... | 60/278 |
| 2006/0242950 A1 * | 11/2006 | Wang et al. | ......... | 60/295 |
| 2007/0261406 A1 | 11/2007 | Boyapati | | |

FOREIGN PATENT DOCUMENTS
AU    2007203624 A1 *  8/2007

OTHER PUBLICATIONS

Yager, J., "System, Method and Device for Locomotive Exhaust Gas Recirculation Cooling and Catalyst Heating", U.S. Appl. No. 12/203,684, filed Sep. 3, 2008, 22 pages.

* cited by examiner

*Primary Examiner* — Quyen Leung
*Assistant Examiner* — Thomas Truong
(74) *Attorney, Agent, or Firm* — Alleman Hall McCoy Russell & Tuttle LLP

(57) ABSTRACT

A method of operating an internal combustion engine having an intake, an exhaust, and a turbocharger including a turbine and a compressor, the compressor coupled to the intake and the turbine coupled to the exhaust, the engine further having an exhaust gas recirculation system coupled to the exhaust upstream of the turbine and coupled to the intake downstream of the compressor, the method including transferring heat via a heat exchanger from the exhaust gas recirculation system to downstream of the turbine.

15 Claims, 5 Drawing Sheets

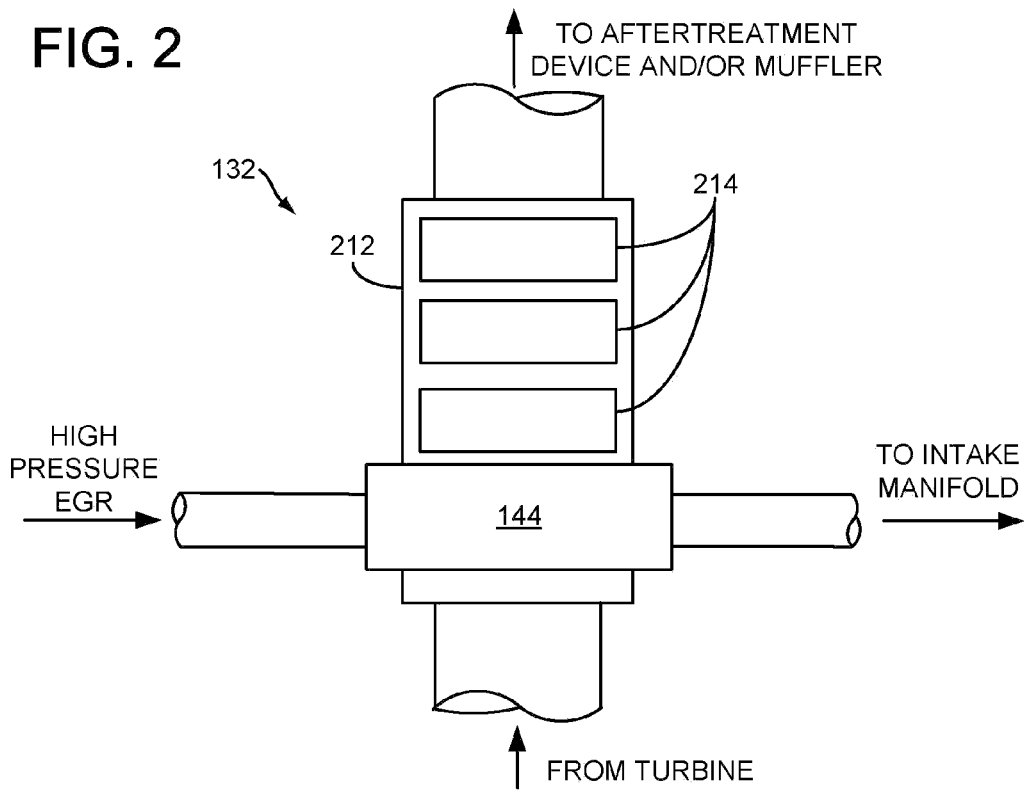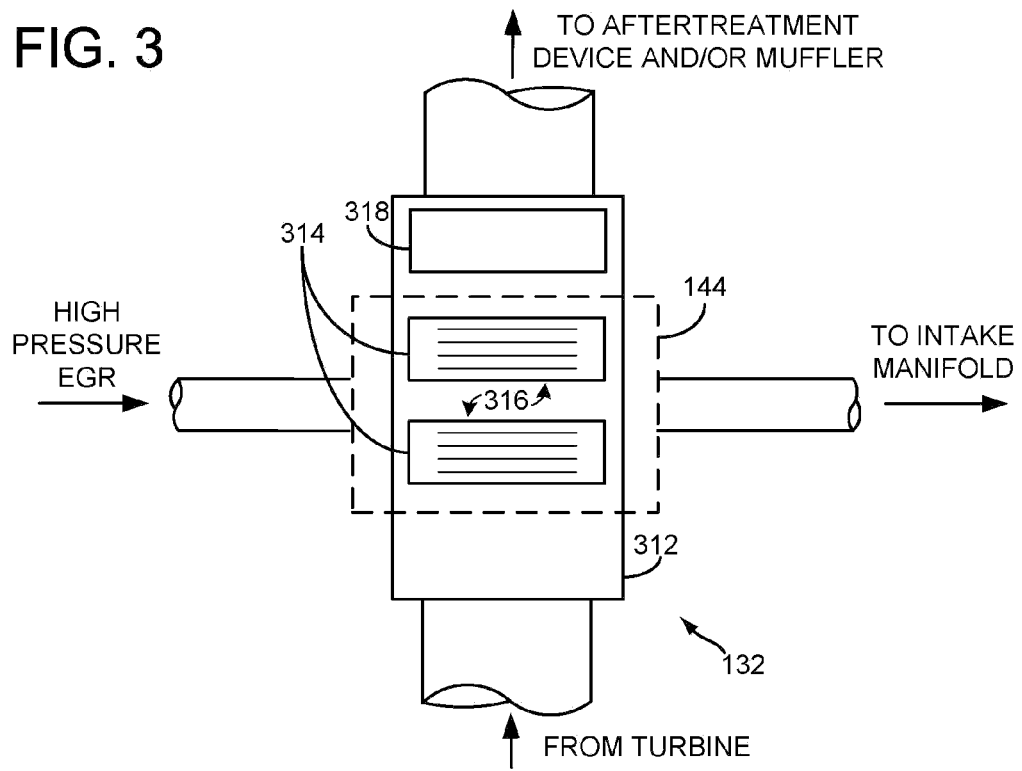

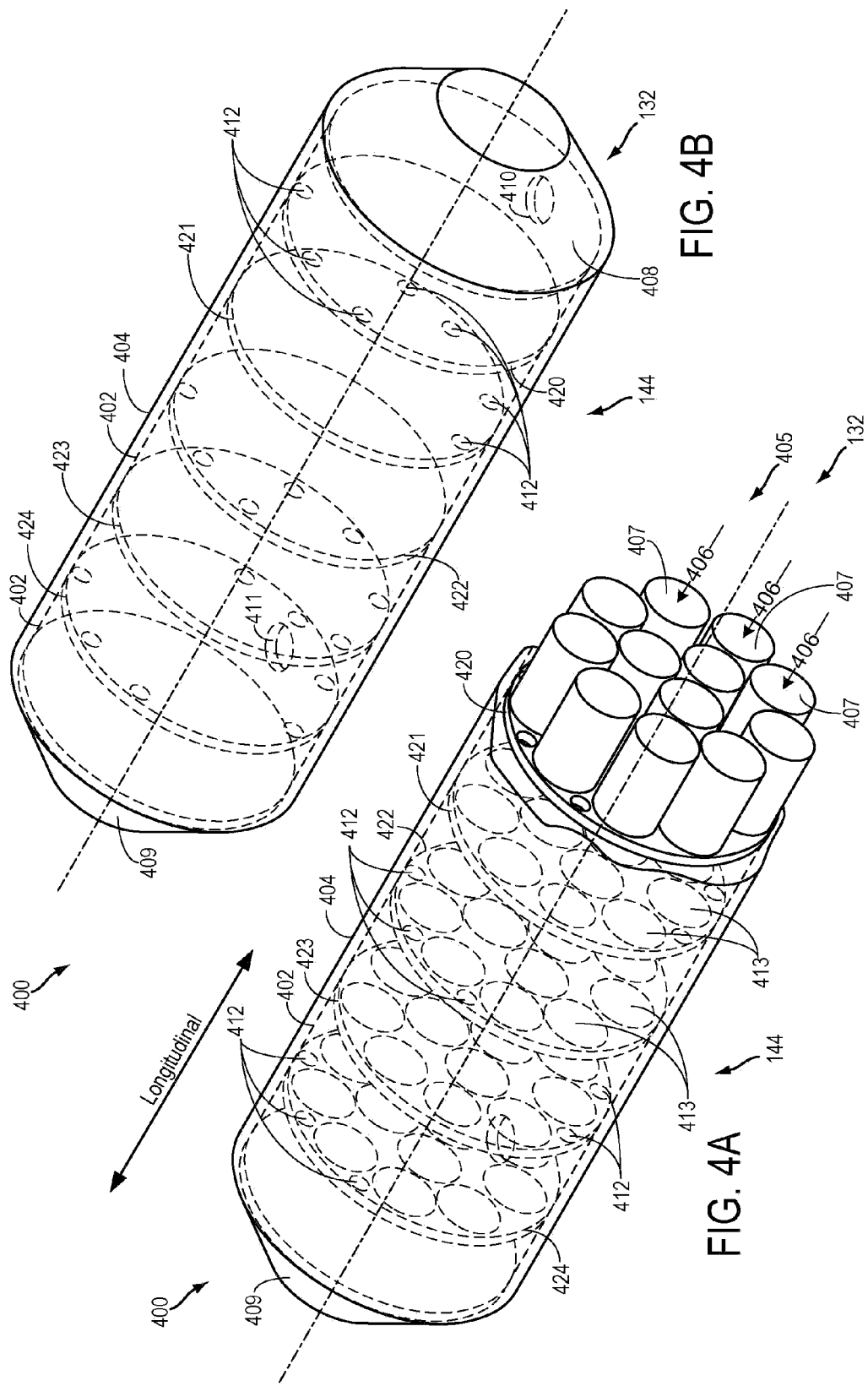

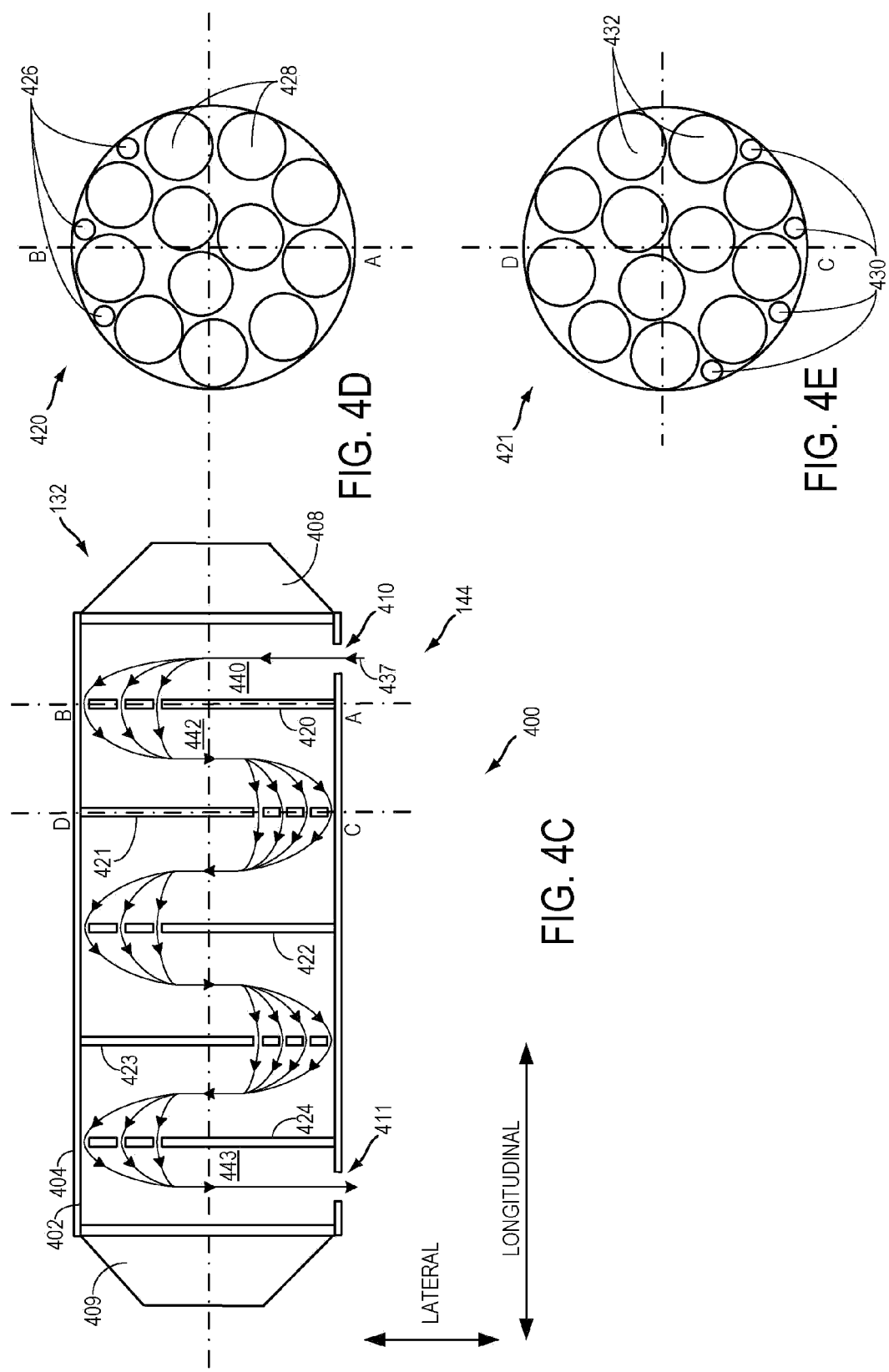

SYSTEM AND METHOD FOR LOCOMOTIVE EXHAUST GAS RECIRCULATION COOLING AND CATALYST HEATING

BACKGROUND

Engines may utilize recirculation of exhaust gas from the engine exhaust system to the engine intake system, a process referred to as Exhaust Gas Recirculation (EGR), to reduce regulated emissions and/or improve fuel economy. Additionally, engines may utilize turbochargers to increase power density and improve efficiency.

However, several issues related to over temperature conditions and under temperature conditions can arise with such systems, especially in a locomotive context using diesel engines. First, high EGR temperatures may require significant EGR cooling, such as where EGR heat is rejected to engine coolant. However, the locomotive engine duty cycle may result in excessive heat rejection to the engine coolant from the EGR, thereby requiring significantly increased engine cooling system size and performance criteria. Second, the expansion and associated temperature reduction of exhaust gasses through the turbine of a turbocharger can cause downstream emission control devices, such as catalytic converters, to cool below temperatures sufficient to perform a substantial amount of exhaust gas conversion (e.g. light-off temperatures). Light-off temperature may be defined as the temperature at which a catalytic converter achieves a predetermined conversion rate or efficiency. The cooled conditions can result in reduced conversion efficiency, thereby increasing regulated emissions.

BRIEF DESCRIPTION OF THE INVENTION

The inventor herein has recognized an interrelationship in the above issues, and further recognized various systems and method to address them. In one example, a method of operating an internal combustion engine is described. The engine includes an intake, an exhaust, and a turbocharger including a turbine and a compressor, the compressor coupled to the intake and the turbine coupled to the exhaust. The engine further has an exhaust gas recirculation (EGR) system coupled to the exhaust upstream of the turbine and coupled to the intake downstream of the compressor. The method includes transferring heat via a heat exchanger from the exhaust gas recirculation system to an exhaust stream or a component downstream of the turbine.

In one embodiment, at least some EGR is routed in a high pressure loop (e.g., from upstream of the turbine to downstream of the compressor). The EGR is thus at a higher pressure and temperature than exhaust gas or other exhaust components downstream of the turbine (due to the expansion through the turbine). As such, the higher pressure/temperature of the exhaust gas recirculation (relative to the exhaust gas or other exhaust components downstream of the turbine) thereby enables the heat transfer.

In this way, it is possible to cool the EGR and heat the exhaust downstream of the turbine, while at the same time reducing the required heat rejection to the engine coolant system. In other words, the rejected heat from the EGR system is advantageously used to heat other components in the exhaust that are below a desired operating temperature, rather than delivered to an already over-burdened cooling system. As such, emission control devices located downstream of the turbine can be maintained at higher temperatures, thereby improving emission control, while reducing cooling requirements of the EGR.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

DESCRIPTION OF THE FIGURES

The present invention will be better understood from reading the following description of non-limiting embodiments, with reference to the attached drawings, wherein below:

FIG. 2 shows a schematic diagram of first embodiment of a heat exchanger included in the locomotive propulsion system shown in FIG. 1;

FIG. 3 shows a schematic diagram of a second embodiment of a heat exchanger included in the locomotive propulsion system shown in FIG. 1;

FIG. 4A shows an isometric view of a third embodiment of the heat exchanger included in the locomotive propulsion system shown in FIG. 1;

FIG. 4B shows an isometric view of the third embodiment of the heat exchanger included in the locomotive propulsion system shown in FIG. 4A, without catalyst bricks;

FIG. 4C shows cut away side view of the third embodiment of the heat exchanger shown in FIG. 4A;

FIG. 4D shows a cross sectional view of a tri-conduit baffle included in the exchanger shown in FIG. 4A;

FIG. 4E shows a cross sectional view of a quad-conduit baffle included in the heat exchanger shown in FIG. 4A.

DETAILED DESCRIPTION

Locomotive and other vehicle propulsion systems may include heat exchangers to improve performance and reduce regulated emissions. In one example, systems, methods, and emission control devices are described where some embodiments may include an integrated heat exchanger to utilize higher temperature Exhaust Gas Recirculation (EGR) gases to maintain temperature of the emission control device, such as when the exhaust gases in the emission control device are below a threshold temperature due to expansion through an upstream turbocharger. In one embodiment where a vehicle emission control device includes one or more catalyst bricks contained in a housing (see, e.g., FIG. 2 and related description), the heat exchanger may be formed using the catalyst bricks and the housing, along with internal baffles directing flow around the exterior of the catalyst bricks. Heat can thus be transferred from the EGR gases flowing around the outside of the catalyst bricks to the catalyst bricks and the exhaust gas flowing within the catalyst bricks while also maintaining the gas flows separate. Such operation allows the temperature of the emission control device to be sufficiently maintained for improved emission conversion efficiency while reducing heat rejected to the engine or other cooling systems used to cool EGR gases. In other words, the rejected heat from the EGR system is advantageously used to heat other components in the exhaust that are below a desired operating temperature, rather than delivered to an already over-burdened cooling system. As such, emission control devices located downstream of the turbocharger (e.g., downstream of a turbine portion of the turbocharger) can be maintained at higher temperatures, thereby improving emission control, while reducing cooling requirements of the EGR.

Figure 1:
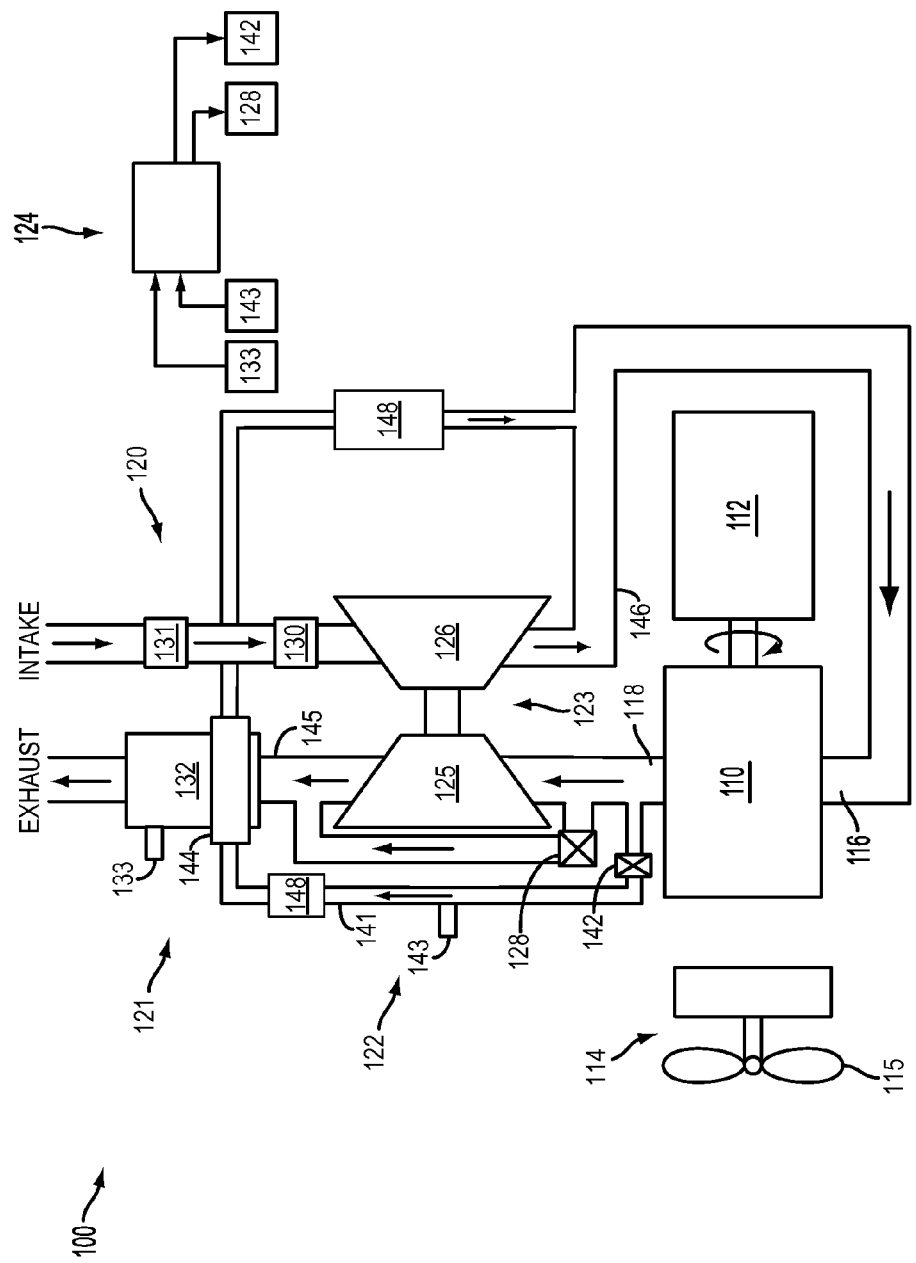
FIG. 1 shows a schematic diagram of a locomotive propulsion system.

FIG. 1 schematically shows an example system configuration 100 for an engine 110 utilizing boosted induction air and exhaust gas recirculation (EGR). The system 100 may be coupled in a locomotive (not shown). Engine 110 operates to drive the locomotive through a transmission 112. Engine 110 is also shown coupled to a liquid cooling system including a radiator 114, which may include one or more controllable fans 115, for cooling liquid engine coolant with ambient air. The engine and associated components may be controlled through a control system 124.

Engine 110 may include a plurality of cylinders coupled between an intake system 120 and an exhaust system 121. Engine 110 may be configured to perform diesel combustion of diesel fuel delivered through a fuel system (not shown). The combustion may include diffusion combustion, or various other types of engine combustion. Furthermore, combustion of other types of fuel may be utilized such as Homogeneous Charge Compression Ignition (HCCI) with gasoline. The intake system 120 includes an intake manifold 116, a throttle 130 allowing the amount of intake air to be adjusted, a conduit 146, and an air filter 131. The exhaust system includes an exhaust manifold 118, turbocharger 123, and the emission control device 132. The turbocharger includes a turbine 125 coupled in the exhaust system and a compressor 126 coupled in the intake system. EGR system 122 is shown coupled between the intake system and exhaust system in a high pressure loop configuration. Specifically, EGR is drawn from the exhaust at a position upstream of the turbine, and delivered to the intake downstream of the compressor.

An emission control device 132 may be coupled downstream of the turbine. The emission control device comprises one or more catalytically or otherwise coated bricks. The device may include a NOx catalyst, a particulate filter, oxidation catalyst, and/or combinations thereof.

While FIG. 1 shows a single intake and exhaust system, the engine may include a plurality of cylinder groups and/or cylinder banks. Each engine bank may include a separate exhaust and intake system in one example, and each of the various intake system components and/or exhaust system components may be duplicated for each bank. Additional emission control devices may be coupled upstream and/or downstream of the emission control device 132.

The turbocharger 123 may operate to extract energy from the exhaust and increase the intake manifold pressure, and thus increase engine output and engine efficiency. Under some operating conditions, the turbine expands exhaust gasses, thereby decreasing the temperature and pressure of the exhaust gas. Additionally, a wastegate 128 may be coupled around the turbine, allowing exhaust fluid to selectively bypass the turbine. The control system can thereby adjust the wastegate to adjust the amount of boost provided by the turbocharger, as well as adjust the exhaust gas temperature and pressure downstream of the turbine. Under some conditions, the wastegate may be adjusted in response to an exhaust temperature (e.g., an emission control device temperature), as described in further detail with regard to FIGS. 4-5, for example.

The control system 124 may include a controller receiving various sensor inputs, and communicating with various actuators. In one example, the sensors include an emission control device temperature sensor 133, coupled to the emission control device 132. The emission control device temperature sensor is configured to measure the temperature of the emission control device. An EGR temperature sensor 143 coupled to the EGR system may also be included. Alternate or additional temperature sensors may be coupled to the exhaust system. The actuators may include the wastegate (valve) 128 and the EGR valve 142, for example.

The EGR system may be configured to transfer exhaust gas from the exhaust system to the intake system. The EGR system 122 includes an EGR valve 142 configured to regulate the amount of exhaust gas recirculated from the exhaust manifold 118 to the intake manifold 116 of engine 110 via the EGR passage 141. EGR valve 142 may be an on/off valve, or a variable-area valve, controlled by control system 124.

The EGR system may further include one or more EGR coolers to cool the EGR during engine operation. In one example, a heat exchanger 144 operates as a first EGR cooler, where EGR heat is transferred to the emission control device and/or exhaust gasses located downstream of the turbine (e.g., because, under some conditions, the EGR operates at a higher temperature than the exhaust gas downstream of the turbine). Additional EGR coolers may also be included upstream and/or downstream of the heat exchanger 144. For example, a second EGR cooler 148 may be coupled downstream of the heat exchanger. The second EGR cooler may transfer EGR heat to engine coolant in the engine cooling system. In one example, the engine cooling system includes a liquid coolant, and an air-to-liquid heat exchanger is coupled to the exhaust gas recirculation system and further coupled to the engine cooling system, e.g., an engine-coolant-cooled shell and tube heat exchanger may be used to cool the EGR flow. Alternatively, the second EGR cooler may transfer EGR heat (e.g., via finned ducts) to ambient airflow generated by vehicle car body motion. Continuing with FIG. 1, in this example the heat exchanger 144 is coupled directly to the emission control device 132. For example, the emission control device and heat exchanger may be integrated, thereby allowing heat to be transferred from the EGR directly to the emission control device, or to exhaust gasses entering or in the emission control device. In other examples, the heat exchanger may be coupled at another suitable location downstream of the turbine, such as in the exhaust conduit 145 coupling the turbine and the emission control device. Additional details of example heat exchanger configurations are described with regard to FIGS. 2-4.

According to the configuration of FIG. 1, heat from the EGR system raises the temperature of the emission control device, thereby increasing the conversion efficiency of the emission control device. Likewise, the EGR temperature is reduced without rejecting (or rejecting less) heat to other engine or vehicle cooling systems, such as the engine cooling system.

Referring now to FIG. 2, it shows a first embodiment of an exhaust configuration with an air-to-air heat exchanger. In this configuration, heat exchanger 144 facilitates heat transfer from high pressure EGR to the emission control device 132 coupled to the exhaust downstream of the turbocharger turbine, thereby allowing the emission control device to operate above a threshold light-off temperature over a greater range of engine operating conditions.

In particular, FIG. 2 shows emission control device 132 coupled downstream of turbine 125. The emission control device includes a housing, or can, 212 enclosing bricks 214. Bricks 214 are configured to carry a catalyst washcoat on a support. The heat exchanger is coupled in the emission control device upstream of the bricks. The heat exchanger passively transfers heat from the high pressure EGR to exhaust gasses entering the emission control device at a position upstream of the bricks. In this way, heat can be transferred directly from the EGR to the expanded exhaust gasses downstream of the turbine.

As noted above, in this embodiment the heat exchanger 144 is an air-to-air heat exchanger. The air-to-air heat exchanger may be a cross-flow heat exchanger or counter-flow heat exchanger. In one particular example, a cross-flow continuous-fin heat exchanger is used.

FIG. 3 shows a second embodiment of an example configuration of the heat exchanger 144 and the emission control device 132. As shown, the emission control device includes a can 312 enclosing bricks 314. In this embodiment, the heat exchanger is coupled directly to a portion of the emission control device, and may be integrated into the emission control device. The heat exchanger may be configured to direct EGR flow over fins 316 coupled to the bricks and/or the can. Additional bricks may be coupled downstream of the heat exchanger, such as brick 318. As such, EGR heat is transferred to the emission control device.

FIGS. 4A-4E show various views of the third embodiment of an example configuration of heat exchanger 144 and emission control device 132. In the third embodiment, the heat exchanger is integrated into the emission control device allowing for a compact and efficient design. Specifically, in this embodiment, EGR flow is directed directly over and/or around the exterior of the catalyst bricks allowing for direct heat transfer from the EGR to the catalyst bricks inside the can to maintain temperature of the catalyst bricks and/or the exhaust gases flowing within the catalyst bricks.

Referring now specifically to FIGS. 4A and 4B, an isometric view of an integrally formed assembly 400 including a heat exchanger 144 and emission control device 132 is illustrated. FIG. 4A shows a cut-away view, while FIG. 4B shows the assembly and a portion of the interior components. The assembly includes a housing, or can, 402, which may include an outer insulating layer 404 and a plurality of catalyst bricks 405. The insulating layer may surround at least a portion of the integrally formed assembly and may be referred to as an insulator. In some examples, the assembly may include one or more catalyst bricks. The catalyst bricks may substantially span the full longitudinal length of the assembly. Exhaust gas 406 may be directed through and within the bricks via internal flow channels in the bricks (not shown) to the atmosphere, where the internal flow channels may be included in interior regions 407 of the catalyst bricks. The exhaust gas is directed to the bricks via the inlet cone 408, which collects the exhaust gases, as shown in FIG. 4B. Again referring to FIG. 4A, the exhaust gases flow through and within the plurality of bricks in parallel, and are then delivered to the outlet cone 409, before exiting assembly 400. In this way the outlet cone expels the exhaust gas flow.

The assembly is shown including five baffles (420, 421, 422, 423, and 424) positioned at a plurality of longitudinal positions, spanning an inner diameter of the can housing. The baffles may be configured to direct and distribute the EGR flow through the interior of the can so that the EGR interacts with the plurality of catalyst bricks therein through the length of the can and across the width of the can. The baffles may each include a plurality of EGR flow transfer holes 412, or conduits, to direct and distribute the EGR flow. The EGR flow transfer conduits may be referred to as communication holes or communication openings. The communication openings provide fluidic communication between EGR flow channels. Further, the baffles may include a plurality of catalyst brick openings 413 through which the catalyst bricks pass. In some examples the cross sectional area of at least one of the communication holes is larger than the cross sectional area of at least one of the bricks. In this way, the catalyst brick opening may be configured to enable the catalyst bricks to pass therethrough. It can be appreciated that the bricks may extend through the baffles, and form a seal between the baffle and the exterior of the catalyst brick.

In one example, the EGR flow transfer conduits 412 are positioned at different locations in adjacent baffles to direct the EGR flow back and forth across the can in a sinuous path as the EGR flows from the EGR inlet to the EGR outlet. In other examples, the EGR flow transfer conduits are positioned on alternating sides or edges. Further, the plurality of regions formed within the can by the baffles each allow EGR to flow around the exterior of the catalyst bricks.

Various baffle and EGR flow transfer conduit configurations may be used. As one example, tri-conduit baffles, having three EGR flow transfer conduits, and quad-conduit baffles, having four EGR flow transfer conduits, may be alternately positioned along the assembly at the longitudinal positions, as illustrated. Both the tri-conduit baffles and quad-conduit baffles may have the communication holes asymmetrically positioned with respect to the can housing. In other examples, alternating baffles may have diametrically positioned communication holes.

Returning to FIG. 4A, the first, third, and fifth baffles (420, 422, and 424 respectively) may be tri-conduit baffles. Additionally, the second and fourth baffles (421 and 423 respectively) may be quad-conduit baffles. The structure can thereby direct the EGR back and forth across the can and exterior of the catalyst bricks extending the flow path of the EGR and increasing the amount of heat transferred between the EGR and the bricks. In this way, the baffles, exterior of the bricks, and the can, may define a region in which the EGR gas may travel.

It can be appreciated, in view of this disclosure, that alternative configurations and arrangements of the baffles may be utilized, allowing the assembly to be modified to desired design specifications, such as heat transfer rates, geometric constraints, etc. For example, the number of EGR conduits included in the baffles and/or the position of the EGR conduits may be altered. Further, the number of baffles may be adjusted. In one example, a single baffle may be provided.

FIG. 4B shows an isometric view of the assembly without bricks or brick openings in the baffles. FIG. 4B shows an EGR inlet 410 (e.g., housing inlet) and an EGR outlet 411 (e.g., housing outlet) that direct EGR through the assembly to enable operation of the heat exchanger. In this example, the EGR inlet and EGR outlet are positioned on the same side. Furthermore, a filter (not shown) configured to retain particulate matter from the EGR may be fluidly coupled to the EGR inlet. Similar components are labeled accordingly.

Referring now to FIGS. 4C-4E, they respectively show a cut away side view of the assembly, and two cross-sectional views at the cross-sections along lines A-B, and C-D.

FIG. 4C illustrates a cut away side view of the integrally formed assembly 400 including the heat exchanger 144 and the emission control device 132. Similar parts are labeled accordingly. An exemplary flow path 437 illustrates a route through which the EGR may travel. The EGR enters the assembly through inlet 410 and travels laterally down a first flow channel 440 formed by the housing and internal structure of the assembly as well as the first baffle. In this way inlet 410 is communicating with the first flow channel. The EGR then may travel longitudinally through the EGR conduits included in the baffles. It can be appreciated that the flow path may travel around longitudinally positioned bricks (not shown) within assembly 400. Subsequently, the EGR may travel laterally down a second flow channel 442 formed by the first baffles, the second baffles, and the assembly housing. The flow path continues in this way until it passes through flow channel 443 and exits the assembly via an outlet 411 positioned on the same side as the inlet. In this way outlet 411 communicates with flow channel 443. It can be appreciated that alternate positioning of the EGR conduits as well as the EGR outlet and inlet may be used to adjust the rate of heat transfer and the flowrate of the EGR.

FIG. 4D shows a cross-sectional view of the first baffle 420, which is a tri-conduit baffle. The first baffle spans an inner diameter of the can. The first baffle includes three EGR conduits 426 and brick openings 428 forming a honeycomb structure. The brick openings allow catalyst bricks to pass through the baffles.

FIG. 4E shows a cross-sectional view of the second baffle 421, which is a quad-conduit baffle. The second baffle likewise spans an inner diameter of can 402. The second baffle includes four EGR conduits 430 and brick openings 432. Brick openings 432 may be aligned with brick openings 428, shown in FIG. 4D, allowing bricks to extend longitudinally through the baffles. The EGR conduits and brick openings may be proximate or directly in contact with one another. Due to the close proximity of the conduits, thermal energy may be transferred, via conduction and/or convection, from the EGR to the emission control device while maintaining a separation of the fluids. A suitable sealant, such as a seam or polyurethane sealant, may be applied to the brick opening in the baffles, preventing EGR from traveling longitudinally through the brick openings.

Figure 5:
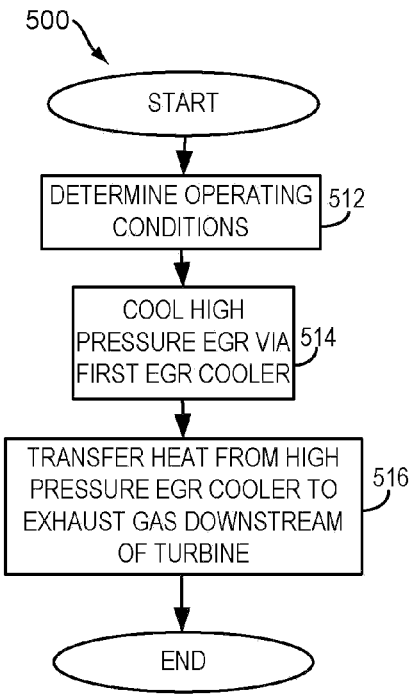
FIGS. 5-6 show flow charts illustrating example methods for managing temperatures of the systems of FIGS. 1-4.
Figure 6:
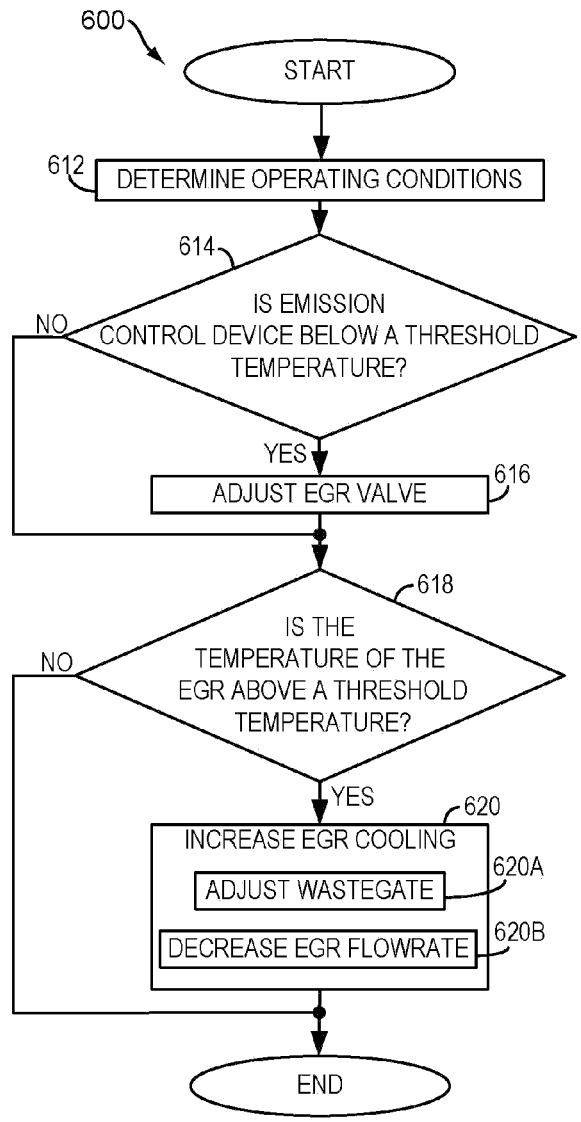

Referring now to FIGS. 5-6, various control methods are described to illustrate example operation of the system 100. Specifically, FIG. 5 shows a flow chart illustrating a method 500 for cooling high pressure EGR by transferring EGR heat to cooler, lower pressure, exhaust gas.

First, at 512, the operating conditions of the engine are determined. The operating conditions may include: ambient temperature, EGR temperature, throttle position, engine temperature, emission control device temperature, exhaust gas composition, intake air pressure, etc.

Next, at 514, the high pressure EGR is cooled via a first EGR cooler, which at 516, transfers EGR heat from the first EGR cooler to the exhaust downstream of the turbine. In one particular example, as noted above, the EGR heat is transferred to an emission control device. Additionally, in some examples, subsequent or prior cooling of the EGR may be performed via a second EGR cooler. After 516, the method ends.

Referring now to FIG. 6, a flow chart illustrates a second example method 600, where emission control device temperature is adjusted via selective operation of the EGR system. In particular, EGR flow is increased (to thereby increase heat transferred to the downstream exhaust) when temperature of the emission control device falls below a threshold value. Additionally, the routine monitors and compensates for EGR over-temperature conditions.

At 612, similar to 512, the operating conditions of the engine are determined. Then, at 614, it is determined if the emission control device temperature has increased above a predetermined threshold value. In some examples, the threshold value may be calculated using various parameters, such as exhaust gas composition.

If it is determined the emission control device temperature is below the threshold value, the method proceeds to 616 where the EGR valve may be adjusted. For example, the EGR flow may be increased via a valve adjustment, thereby increasing heat transfer via heat exchanger 144. In this way, additional heat can be provided to increase temperature of the exhaust downstream of the turbine, thereby increasing temperature of the emission control device.

Specifically, rather than reduce EGR in order to raise the temperature of the engine out exhaust temperature, EGR flow can be increased under some conditions. In this way, it is possible to avoid degrading effects of reduced EGR (e.g., increased engine out emissions or the like).

Continuing with FIG. 6, if the answer to 614 is NO, the method continues to 618 where it is determined if the temperature of the EGR is above a threshold value. If it is determined that the temperature of the EGR is above a threshold value, the EGR cooling is increased at 620. Increasing EGR cooling may include adjusting the wastegate at 620A to reduce flow bypass (e.g., closing the wastegate). Further, increasing EGR cooling may also include decreasing the EGR flowrate at 620B, thereby reducing heat transfer through the one or more EGR coolers. In this way, the control system adjusts the wastegate in response to an increase in EGR temperature. However, if the EGR is not above a threshold value, the method ends.

In this way, an engine cooling system size and performance criteria may be significantly reduced by reducing the amount of heat rejected to the engine coolant system. Further, by advantageously using heat rejected from an EGR system to judiciously heat exhaust components, emissions quality can be improved.

As should be appreciated, "brick" is a term of art, and refers to a body that can carry a catalyst washcoat or other catalyst, and not necessarily to a rectangular solid, although that is one possible configuration. Also, as indicated above, the term "can" refers to a housing.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

The invention claimed is:

1. A method of operating an internal combustion engine having an intake, an exhaust, and a turbocharger including a turbine and a compressor, the compressor coupled to the intake and the turbine coupled to the exhaust, the engine further having an exhaust gas recirculation (EGR) system coupled to the exhaust upstream of the turbine and coupled to the intake downstream of the compressor, the method comprising:
    directing EGR gas from the exhaust upstream of the turbine through an air-to-air heat exchanger;
    directing exhaust gas downstream of the turbine through the heat exchanger for heat transfer with the EGR gas; and
    heating the exhaust gas via the heat exchanger upstream of an emission control device for raising a temperature of the emission control device.

2. The method of claim 1 wherein said heating includes transferring heat from a higher pressure EGR flow to a lower pressure exhaust gas downstream of the turbine.

3. The method of claim 1 wherein said emission control device is coupled directly to said heat exchanger.

4. The method of claim 1 further comprising adjusting operation of the turbocharger to reduce wastegate flow of exhaust gas through the turbine when a temperature of the EGR gas is above a threshold temperature.

5. The method of claim 1 further comprising adjusting an amount of EGR gas flow responsive to a temperature of the emission control device.

6. The method of claim 5 wherein the adjusting includes increasing the amount of EGR gas flow when the temperature of the emission control device is below a threshold value.

7. A system for a vehicle, comprising:
an engine having an intake and an exhaust;
a turbocharger having a compressor coupled to the intake and a turbine coupled to the exhaust;
an emission control device coupled downstream of the turbine;
an exhaust gas recirculation (EGR) system coupled to the intake downstream of the compressor, and further coupled to the exhaust upstream of the turbine; and
an air-to-air heat exchanger coupled to the EGR system and further coupled to the exhaust downstream of the turbine and upstream of the emission control device, the heat exchanger configured to cool EGR gas flow and heat exhaust gas entering the emission control device.

8. The system of claim 7 wherein the vehicle is a locomotive.

9. The system of claim 8 further comprising:
an engine cooling system including a liquid coolant; and
an air-to-liquid heat exchanger coupled to the EGR system and further coupled to the engine cooling system.

10. The system of claim 8 wherein the emission control device includes a can enclosing at least one brick, and where the air-to-air heat exchanger is further enclosed within the can of the emission control device.

11. The system of claim 8 further comprising a control system configured to adjust an amount of EGR gas flow through the EGR system based on a temperature of the emission control device.

12. A locomotive exhaust system for an engine having an intake and an exhaust, comprising:
a turbocharger having a compressor coupled to the intake and a turbine coupled to the exhaust;
an emission control device coupled in fluid communication with the exhaust and positioned downstream of the turbine;
an exhaust gas recirculation (EGR) system coupled to the intake downstream of the compressor, and further coupled to the exhaust upstream of the turbine, the EGR system including a valve; and
an air-to-air heat exchanger having a first path and a second path, the first path in fluid communication with the EGR system and the second path in fluid communication with the exhaust downstream of the turbine and upstream of the emission control device, the heat exchanger configured to cool EGR gas flow and heat exhaust gas entering the emission control device.

13. The system of claim 12 further comprising a housing, the housing enclosing the heat exchanger and one or more bricks of the emission control device.

14. The system of claim 12 wherein the air-to-air heat exchanger is a counter-flow heat exchanger.

15. A locomotive exhaust system for an engine having an intake and an exhaust, comprising:
a turbocharger having a compressor coupled to the intake and a turbine coupled to the exhaust;
an emission control device coupled in the exhaust and positioned downstream of the turbine;
an exhaust gas recirculation system coupled to the intake downstream of the compressor, and further coupled to the exhaust upstream of the turbine, the exhaust gas recirculation system including a valve;
an air-to-air heat exchanger having a first path and a second path, the first path in the exhaust gas recirculation system and the second path in the exhaust downstream of the turbine and upstream of the emission control device, the heat exchanger configured to cool exhaust gas recirculation flow and heat exhaust gas entering the emission control device; and
an exhaust gas recirculation cooler coupled in the exhaust gas recirculation system upstream of the heat exchanger;
wherein the air-to-air heat exchanger is a cross-flow heat exchanger.

* * * * *